Nov. 2, 1948.　　　　　M. P. WINTHER　　　　　2,452,820
EDDY CURRENT COUPLING

Filed Aug. 26, 1946　　　　　　　　　　　　　3 Sheets-Sheet 1

Martin P. Winther,
Inventor.
Haynes and Koenig
Attorneys.

Nov. 2, 1948.    M. P. WINTHER    2,452,820
EDDY CURRENT COUPLING

Filed Aug. 26, 1946    3 Sheets-Sheet 2

Martin P. Winther
Inventor
Haynes and Koenig
Attorneys

Nov. 2, 1948.    M. P. WINTHER    2,452,820
EDDY CURRENT COUPLING
Filed Aug. 26, 1946    3 Sheets-Sheet 3

Patented Nov. 2, 1948

2,452,820

UNITED STATES PATENT OFFICE 2,452,820

EDDY-CURRENT COUPLING

Martin P. Winther, Waukegan, Ill., assignor to Martin P. Winther, as trustee, Waukegan, Ill.

Application August 26, 1946, Serial No. 693,057

25 Claims. (Cl. 172—284)

1

This invention relates to eddy-current couplings and, more particularly, to an eddy-current coupling for use as an automotive or similar clutch.

Among the several objects of the invention may be noted the provision of an eddy-current coupling particularly for use as a clutch wherein the driven member of the clutch is of light weight and has a low moment of inertia so as to permit easy shifting of the gears of the transmission; the provision of a coupling of the class described adapted to transmit high torque at relatively low field energization; the provision of a coupling of this class having a minimum flux air gap; the provision of a coupling of this class the performance of which is substantially unaffected by foreign matter in the air gap; and the provision of a coupling of this class wherein the driving and driven elements will not seize or bind even under the most severe operating conditions. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a longitudinal section of the eddy-current coupling of this invention;

Similar reference characters indicate corresponding parts throughout the several views of the drawings.

Figure 1:
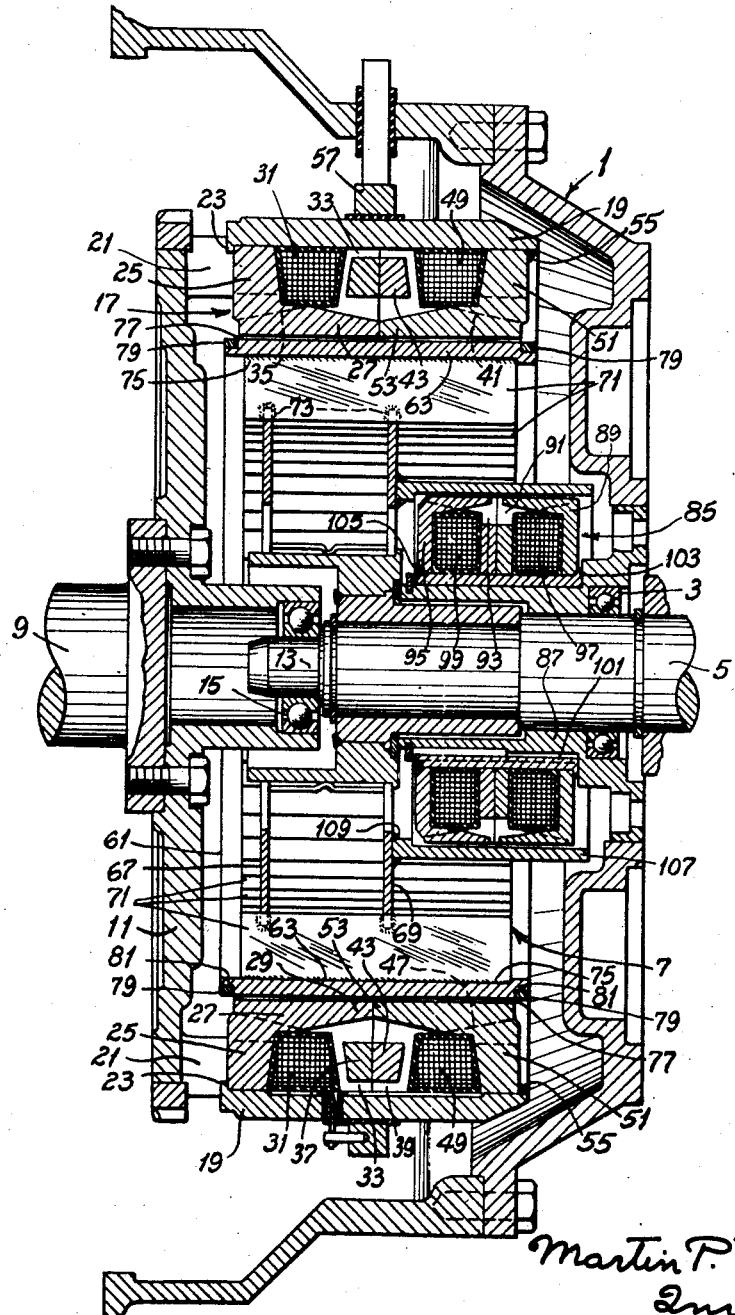
Figure 2:
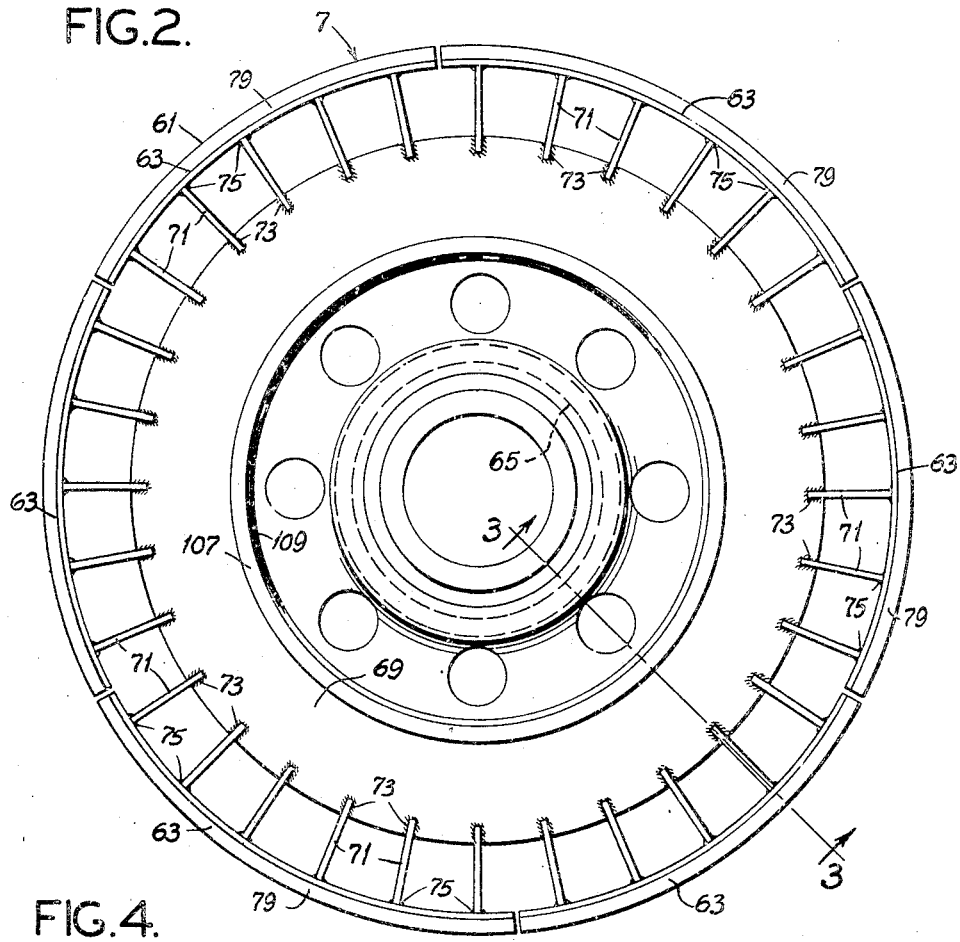
Fig. 2 is a side elevation of the inductor member of the coupling.

The eddy-current coupling of this invention is particularly described herein with reference to its application as a clutch for use in automotive vehicles. It will be understood, however, that the coupling described herein is adapted to function as a clutch for other purposes and also, alternatively, as a brake, dynamometer or the like.

Referring now to the drawings, there is shown

2 at 1 a clutch housing wherein is journalled, by means of bearing 3, an end of a driven shaft 5. Fixed on the shaft is the inductor member, generally designated 7, of the eddy-current coupling of this invention. Reference character 9 designates the automotive crank shaft having flywheel 11 bolted thereto. This shaft constitutes the drive shaft of the clutch. The reduced end 13 of the driven shaft 5 is journalled in a pilot bearing 15 in the flywheel. Carried by the flywheel surrounding the inductor member 7 is the annular field member, generally designated 17, of the eddy-current coupling.

The field member 17 includes a drum 19 secured to posts 21 extending from the flywheel. The drum is formed with an inwardly directed rim 23 on the side toward the flywheel. An annular toothed ring 25 is carried within the drum in engagement with the rim. The teeth 27 of ring 25 extend axially inward from the inner periphery of the ring toward the opposite side of the drum. These teeth are generally triangular in plan and, as indicated at 29, taper toward their free ends, which lie in the central transverse plane of the drum.

An annular field coil 31 is disposed in the annular channel formed by the toothed ring 25 and drum 19. This coil is retained in the channel by a second toothed ring 33. Ring 33 comprises a series of spaced teeth 35 joined by bridges 37. Teeth 35 are triangular and tapered like teeth 27, and extend axially outward from the central transverse plane of the drum, fitting between teeth 27 with spaces therebetween.

Abutting ring 33 on the central transverse plane of and within drum 19 is a third toothed ring 39 which is identical with ring 33 but reversed with respect thereto so that its teeth 41 extend axially outward from the central transverse plane of drum 19 toward the right side of the drum as viewed in Fig. 1. The teeth 41 and bridges 43 of ring 39 abut teeth 35 and bridges 37 of ring 33.

A second annular field coil 49 is disposed in the annular channel formed by the toothed ring 39 and drum 19. This coil is retained in the channel by a fourth toothed ring 51. Ring 51 is identical with ring 25 but reversed with respect thereto so that its teeth 53 extend axially inward from the right side of drum 19. Teeth 53 terminate at the central transverse plane of the drum, in engagement with the tips of teeth 27, and lie between teeth 41 of ring 39 with spaces therebetween.

In assembling the field member, the toothed rings and coils are serially telescoped into the drum through its open side (the right side as viewed in Fig. 1) and are retained within the drum by welding 55. The drum and rings are formed of material of high magnetic permeability and low electrical resistance, preferably magnetic ingot iron such as described in the copending application of myself and Anthony Winther for Dynamoelectric machine, Serial No. 616,122, filed September 13, 1945. The teeth form the poles of the field member. The side rings 25 and 51 are formed with teeth 27 and 53, respectively, which extend axially inward toward each other. The juxtaposed central rings 33 and 39 abut on the central transverse plane of the drum 19 between the side rings. The teeth 35 of ring 33 extend axially outward between the teeth 27 of the adjacent side ring 25. The teeth 41 of ring 39 extend axially outward in the other direction between the teeth 53 of the adjacent side ring 51. The resulting structure is a field having a series of spaced diamond-shaped pole faces, formed by pole teeth 35 and 41, and a series of hourglass-shaped pole faces, formed by pole teeth 27 and 53, between the diamond-shaped pole faces.

As illustrated, each pole tooth is triangular in plan and tapered toward its free end so that its cross section diminishes from its root to its tip. It is not essential that the teeth be of this particular conformation, but it is important that they diminish in cross section toward their free ends.

The field coils 31 and 49 are energized from the electrical power supply system of the automotive vehicle through a single slip-ring connection 57, the coils being grounded through the drum 19 and flywheel 11.

The inductor member 7 includes a discontinuous inductor ring 61 consisting of ring segments 63, formed preferably of the above-described magnetic ingot iron, which are supported upon the hub 65 of the inductor member by means permitting inward deflection of the segments for a purpose to be mentioned. The hub 65 is keyed upon the driven shaft 5. Fixed on the hub are axially spaced, thin, circular plates 67 and 69 in planes transverse to the hub. A plurality of thin, flexible fins 71 are secured to the peripheries of the plates. Each fin comprises a flat metallic strip disposed in a radial plane, and extending radially outward from the peripheries of the plates. Each fin extends axially, spanning the plates, and is secured in aligned notches in the peripheries of plates 67 and 69 by welding or brazing 73. The ring segments 63 are secured to the radially outermost ends of the fins by welding or brazing 75.

Figure 4:
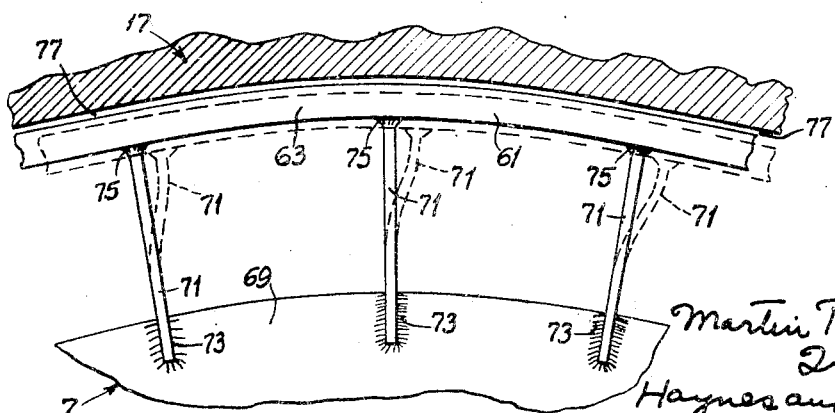
Fig. 4 is an enlarged fragmentary transverse section of the inductor member.
Figure 3:
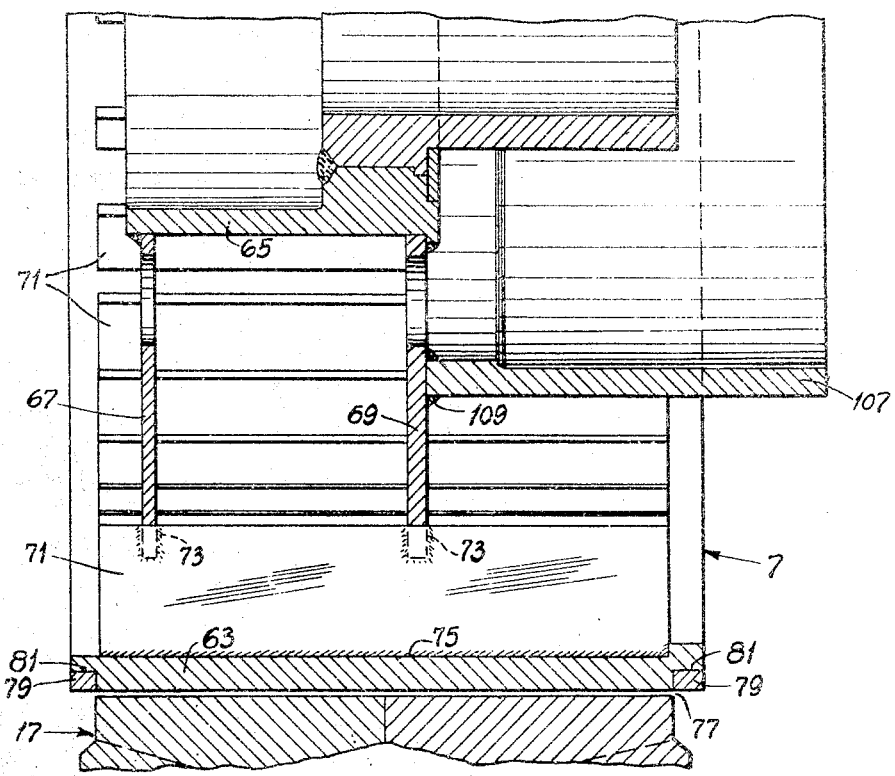
Fig. 3 is an enlarged fragmentary section of the inductor member taken on line 3—3 of Fig. 2.
Figure 5:
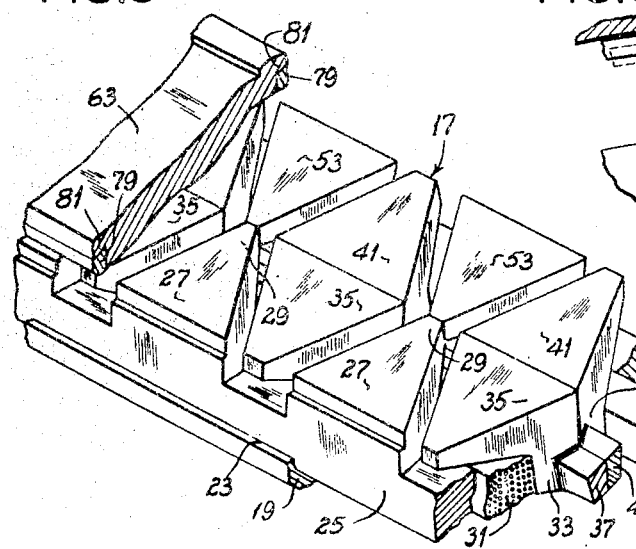
Fig. 5 is a fragmentary isometric view of a development of the field member of the coupling; and, Fig. 6 is a section similar to Fig. 4, on a reduced scale, of a modification of the inductor member.

The inductor ring 61 is disposed within the field member 17 in such manner that the outer faces of its ring segments 63 lie in a cylindrical surface concentric with the cylindrical surface defined by the pole faces of the field member, with a very small air gap 77. This gap may be made much less than it was heretofore. The flat fins 71 are sufficiently resilient so that if closure of the air gap should occur upon heating or if any particles of foreign matter should enter the air gap 77, the inductor ring segments 63 readily deflect inward, as illustrated by the dotted lines in Fig. 4. This avoids seizure or binding of the inductor member and the field member, even when exceedingly small air gaps are used. Such small air gaps are conducive to high electrical coupling efficiency.

An important feature of the inductor member, in addition to its ability to contract inward as above described, is its relatively low moment of inertia. It will be noted that the inductor ring segments 63 are radially thin and also that the supporting means for the segments, consisting of the plates 67 and 69 and fins 71, is of light-weight open construction. Since the segments 63 are thin, there are no unduly large masses of material in the periphery of the inductor member to increase its moment of inertia to an undesirably high value. This is an important feature in an eddy-current clutch for automotive use wherein it is desirable to have the driven element of the clutch of low moment of inertia to facilitate the operations of shifting gears. The thin, light-weight construction of the inductor ring segments 63 of this invention is made possible by the provision of copper eddy-current conducting ring segments 79 in ring segments 63, in conjunction with the toothed field member herein disclosed. Each segment 63 of the inductor ring is formed with peripheral recesses 81 extending the full arcuate length of the segments at opposite sides thereof. The conducting ring segments 79 are secured in these recesses in good electrical contact with the inductor ring segments 63, as by silver brazing. I have found that the thickness of the inductor ring segments 63 having the eddy-current conducting ring segments 73 may be as low as one-third of the thickness of such ring segments without conducting ring segments, for substantially the same torque capacity. This is particularly true of a coupling wherein the field member is of the toothed construction such as herein disclosed, or the equivalent.

Another advantage of the thin character of the parts 67, 69 and 71 is that they may readily be fabricated by stamping and unified by welding or brazing.

Also illustrated herein is an annular braking field member, generally designated 85, mounted in fixed relation with respect to the inductor member 7 on the tubular extension 87 from clutch housing 1. The braking field member comprises four toothed rings 89, 91, 93 and 95 and a pair of field coils 97 and 99 similar to the rings 25, 33, 39 and 51 and coils 31 and 49 of the inductor member 7. These braking field elements are assembled by telescoping them over a sleeve 101 which is keyed to extension 87, the sleeve having a rim 103 at its right-hand end (Fig. 1). Welding 105 maintains the braking field elements in assembled relation.

Surrounding the braking field member 85 is a brake inductor drum 107 which is secured to the plate 69 of the clutch inductor member 7 by welding or brazing 109. The coils 97 and 99 of the braking field member are adapted to be energized from the electric power supply system of the automotive vehicle. When these coils are energized, eddy-currents are induced in the inductor drum 107 to brake the inductor member 7.

The clutch coils 31 and 49 and the brake coils 97 and 99 are connected in a control circuit which is under the control of the automotive clutch pedal and the automotive transmission, as particularly described in my copending application Serial No. 708,422, filed November 7, 1946, for Clutch control. As particularly set forth in said application, the inductive brake constituted by the braking field 85 and brake inductor drum 107 is energized when the automotive transmission is in neutral to reduce the speed of driven shaft 5 so that it rotates very slowly. This facilitates the synchronization of the transmission and permits shifting to forward or reverse very quickly when the vehicle is at standstill.

In operation, the flywheel 11 and field member 17 are driven as a unit by the crankshaft 9 of the automotive engine. When the field coils 31 and 49 are energized, the inductor member 7 is inductively driven with slip to rotate the driven shaft 5 and transmit torque. The inductor member is light in weight and, because of the thinness of the inductor ring segments 63, has a low moment of inertia. This is important so far as the transmission of the automotive vehicle is concerned, since it is desirable that the driven member of the automotive clutch have low moment of momentum to avoid undue slipping at the synchronizing friction cones of the gear-synchronizing device of the transmission and to make it easier to shift into low or reverse gears when the automotive vehicle is at standstill. Despite the thinness of the segments 63, the coupling is adapted to transmit high torque at low field energization, due to the toothed field rotor construction and the provision of the eddy-current conducting ring segments 79 in the inductor ring segments 63.

Another factor contributing to the ability of the coupling to transmit high torque at low field energization is the small air gap made possible by the provision of the contractile inductor member. In actual practice I have found it possible to make the air gap as small as .010 inch under cool conditions of the field and inductor members. Even though the outer surfaces of the inductor ring segments 63 should contact the pole faces of the field member upon thermal expansion, these segments will not seize or bind in the field member due to their ability to deflect inward. With the radial fins of Figs. 1-4, however, I have found that the change in the air gap occurring when the coupling becomes heated during operation is so small that such contact does not normally occur.

Another advantage of the contractile inductor member is its ability to deflect inward under forces resulting from particles of foreign matter entering the small air gap. Relatively small-sized particles would in the absence of the invention cause difficulty. Any introduced particles are quickly expelled from the air gap and the clutch continues to perform as before they entered.

Figure 6:
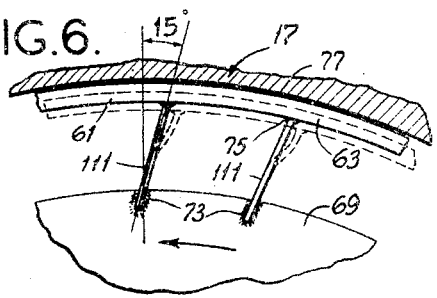

Fig. 6 illustrates a modification of the inductor member of the coupling wherein the fins 111, corresponding to fins 71 of Fig. 1, are inclined at angles to radial planes instead of extending radially outward from the peripheries of plates 67 and 69. Each fin 111 is preferably inclined at an angle of approximately 15° to the radial plane through the intersection of the fin and the peripheries of the plates. With this construction it is possible to have an extremely small air gap without danger of seizure of the field and inductor members under the most severe operating conditions. In an embodiment of this modification, the air gap was so small that the inductor ring segments actually slightly touched the field pole faces when both were at ambient temperatures, yet seizure did not occur.

Another advantage of the resilient inductor construction is that the stated small air gaps may be accommodated even with the relatively large eccentricities which are found in automotive clutch pilot bearings such as 15. These sometimes are of the sleeve type in which substantial play is allowed which would affect the concentricity of the air gap.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In an eddy-current coupling, a discontinuous inductor ring consisting of a plurality of ring segments, and resilient means supporting said segments for permitting substantially radial deflections thereof throughout the extent of said segments.

2. In an eddy-current coupling, a hub, a discontinuous inductor ring consisting of a plurality of ring segments surrounding the hub, and resilient means supporting said segments on the hub and permitting inward deflection of the segments toward the hub throughout the extent of said segments.

3. In an eddy-current coupling, a discontinuous inductor ring consisting of a plurality of ring segments, and flexible fins supporting said segments for permitting substantially radial deflection thereof throughout the extent of said segments.

4. In an eddy-current coupling, a hub comprising at least one radial disc, a discontinuous inductor ring consisting of a plurality of ring segments surrounding the hub, and flexible fins joining said segments with the hub and permitting inward deflection of the segments toward the hub throughout the extent of said segments.

5. In an eddy-current coupling, a hub, axially spaced, transversely disposed, circular plates on the hub, axially extending flexible fins secured to the peripheries of the plates and extending outward therefrom, and a discontinuous inductor ring consisting of a plurality of ring segments secured to the outer ends of said fins.

6. In an eddy-current coupling, a hub, axially spaced, transversely disposed, circular plates on the hub, axially extending flexible fins secured to the peripheries of the plates, each fin comprising a thin metallic strip disposed in a radial plane and extending radially outward from the peripheries of the plates, and a discontinuous inductor ring consisting of a plurality of ring segments secured to the outer ends of said fins.

7. In an eddy-current coupling, a hub, flexible fins secured to the hub, each fin comprising a thin metallic strip disposed in a plane at an acute angle to a radial plane through the axis of the hub and extending outward, and a discontinuous inductor ring consisting of a plurality of ring segments secured to the outer ends of said fins.

8. In an eddy-current coupling, a hub, axially spaced, transversely disposed, circular plates on the hub, axially extending flexible fins secured to the peripheries of the plates, each fin comprising a thin metallic strip disposed in a plane at an acute angle to a radial plane through the intersection of the fin and the peripheries of the plates and extending outward from the peripheries of the plates, and a discontinuous inductor ring consisting of a plurality of ring segments secured to the outer ends of said fins.

9. An eddy-current coupling comprising an annular field member and a contractile inductor within said field member with an air gap therebetween, said inductor being adapted to contract inward away from said field member upon encountering any substantial resistance in said air gap.

10. An eddy-current coupling comprising an annular field member and a contractile inductor within said field member with an air gap therebetween, said inductor comprising a discontinuous ring consisting of a plurality of ring segments, and means supporting said segments for inward deflection away from said field member in the event of entry of any particles of foreign matter in said air gap.

11. An eddy-current coupling comprising an annular field member, an inductor within said field member with an air gap therebetween, said inductor comprising a discontinuous ring consisting of a plurality of ring segments, and means supporting said segments for inward deflection away from said field member, said segments being thin with respect to their radius and said supporting means being of light-weight construction so that the moment of inertia of said inductor is of relatively low value.

12. An eddy-current coupling comprising an annular field member, an inductor within said field member with an air gap therebetween, said inductor comprising a discontinuous ring consisting of a plurality of ring segments, and means supporting said segments for inward deflection away from said field member, said segments being thin with respect to their radii, each segment having on opposite sides thereof peripheral conducting ring segments.

13. An eddy-current coupling comprising a circular field member, an inductor adjacent to said field member with an air gap therebetween, said inductor comprising a discontinuous ring consisting of a plurality of ring segments, each segment having on opposite sides thereof peripheral eddy-current conducting ring segments.

14. An eddy-current coupling comprising a circular field member, an inductor adjacent to said field member with an air gap therebetween, said inductor comprising a discontinuous ring consisting of a plurality of ring segments, said segments being relatively thin with respect to their radii, each segment having on opposite sides thereof peripheral eddy-current conducting ring segments extending the arcuate length of the segment at opposite sides thereof.

15. An eddy-current coupling comprising an annular field member including a first annular series of spaced pole teeth extending axially in one direction from their roots in said member to their free ends, and a second annular series of spaced pole teeth extending axially in the opposite direction from their roots in said member to their free ends and disposed between the teeth of said first series, an inductor within said field member with an air gap therebetween, said inductor comprising a discontinuous ring consisting of a plurality of ring segments, and means supporting said segments for inward deflection away from said field member, said segments being thin with respect to their radii.

16. An eddy-current coupling comprising an annular field member including a first annular series of spaced pole teeth extending axially in one direction from their roots in said member to their free ends, and a second annular series of spaced pole teeth extending axially in the opposite direction from their roots in said member to their free ends and disposed between the teeth of said first series, an inductor within said field member with an air gap therebetween, said inductor comprising a discontinuous ring consisting of a plurality of ring segments, and means supporting said segments for inward deflection away from said field member, said segments being thin with respect to their radii, each segment having eddy-current conducting ring segments extending the arcuate length of the segment at opposite sides thereof.

17. In an eddy-current coupling, a field member comprising a pair of axially spaced coaxial side rings, each of said rings being formed with pole teeth spaced around its periphery and extending axially therefrom toward the teeth of the other ring, a pair of juxtaposed coaxial rings intermediate said side rings, said intermediate rings abutting on an intermediate transverse plane between said side rings, each of said intermediate rings being formed with pole teeth spaced around its periphery and extending axially outward therefrom between the teeth of the adjacent side ring, and a field coil confined between each side ring and the adjacent intermediate ring.

18. In an eddy-current coupling, a field member comprising a pair of axially spaced coaxial side rings, each of said rings being formed with pole teeth spaced around its periphery and extending axially therefrom toward the teeth of the other ring but in abutting and opposite relation thereto, a pair of juxtaposed coaxial rings intermediate said side rings, said intermediate rings abutting on the central transverse plane between said side rings, each of said intermediate rings being formed with pole teeth spaced around its periphery and extending oppositely axially outward therefrom between the teeth of the adjacent side ring, and a field coil confined between each side ring and the adjacent intermediate ring.

19. In an eddy-current coupling, a field member comprising a pair of axially spaced coaxial side rings, each of said rings being formed with pole teeth spaced around its periphery and extending axially therefrom toward the teeth of the other ring, a pair of juxtaposed coaxial central rings intermediate said side rings, said central rings abutting on the central transverse plane between said side rings, each of said central rings being formed with pole teeth spaced around its periphery and extending axially outward therefrom between the teeth of the adjacent side rings, and a field coil confined between each side ring and the adjacent central ring, each of said pole teeth diminishing in cross section from its root in its respective ring to its opposite end.

20. In an eddy-current coupling, a field member comprising a pair of axially spaced coaxial side rings, each of said rings being formed with pole teeth spaced around its periphery and extending axially therefrom toward the teeth of the other ring, a pair of juxtaposed coaxial central rings intermediate said side rings, said central rings abutting on the central transverse plane between said side rings, each of said central rings being formed with pole teeth spaced around its periphery and extending axially outward therefrom between the teeth of the adjacent side ring, and a field coil confined between each side ring and the adjacent central ring, all of said rings and coils being telescoped within a drum having a rim at one end thereof, and means at the other end of the drum retaining said rings and coils therein.

21. In an eddy-current coupling, a field member comprising a pair of axially spaced coaxial magnetic side rings, each of said rings being formed with tapered magnetic pole teeth spaced around its periphery and extending axially therefrom toward contact with the teeth of the other ring, a pair of juxtaposed coaxial central magnetic rings intermediate said side rings, said central rings abutting with magnetic contact on the central transverse plane between said side rings, each of said central rings being formed with tapered pole teeth spaced around its periphery and extending axially outward therefrom between the teeth of the adjacent side ring, and a field coil confined between each side ring and the adjacent central ring, all of said rings and coils being telescoped with magnetic contact over a magnetic sleeve having a rim at one end thereof, and means at the other end of the sleeve retaining said rings and coils thereon.

22. An eddy-current clutch comprising a drive shaft, an annular field member on said drive shaft, a driven shaft, an inductor member on said driven shaft within said field member with an air gap therebetween, said inductor member comprising a discontinuous ring consisting of a plurality of ring segments, means supporting said segments on said driven shaft for inward deflection away from said field member toward said driven shaft, and an inductive brake for said inductor member including a braking field member fixed with respect to said inductor member.

23. An eddy-current clutch for an automotive vehicle having a drive shaft with a flywheel thereon, comprising an annular field member carried by the fly-wheel, a driven shaft, a contractile inductor on said driven shaft within said field member with an air gap therebetween, said inductor being adapted to contract inward away from said field member, and means for braking said inductor.

24. An eddy-current clutch for an automotive vehicle having a drive shaft with a flywheel thereon, comprising an annular field member carried by said fly-wheel, a driven shaft, an inductor member on said driven shaft within said field member with an air gap therebetween, said inductor member comprising a discontinuous ring consisting of a plurality of ring segments, means supporting said segments for inward deflection away from said field member, said segments being thin with respect to their radii and the moment of inertia of said inductor member being of relatively low value, and an inductive brake for said inductor member including a braking field member fixed with respect to said inductor member.

25. An eddy-current coupling comprising a circular field member, a circular inductor, means mounting said member and inductor with one surrounding the other and with an air gap therebetween, said inductor comprising a discontinuous ring consisting of a plurality of ring segments, and resilient means supporting said segments for deflection away from said field member in the event of entry of any particles of foreign matter in said air gap.

MARTIN P. WINTHER.

REFERENCES CITED

The following references are of record in the file of this patent:

UNITED STATES PATENTS

| Number | Name | Date |
| --- | --- | --- |
| 600,088 | Nell | Mar. 1, 1898 |
| 2,255,420 | Graham | Sept. 9, 1941 |
| 2,306,582 | Winther | Dec. 29, 1942 |

FOREIGN PATENTS

| Number | Country | Date |
| --- | --- | --- |
| 551,414 | Great Britain | Feb. 22, 1943 |